United States Patent
Xu (10) Patent No.: US 10,371,381 B2
(45) Date of Patent: Aug. 6, 2019

(54) COMBUSTOR WALL FOR A GAS TURBINE ENGINE AND METHOD OF ACOUSTIC DAMPENING

(71) Applicant: United Technologies Corporation, Hartford, CT (US)

(72) Inventor: JinQuan Xu, East Greenwich, RI (US)

(73) Assignee: United Technologies Corporation, Farmington, CT (US)

( * ) Notice: Subject to any disclaimer, the term of this patent is extended or adjusted under 35 U.S.C. 154(b) by 1000 days.

(21) Appl. No.: 14/805,963

(22) Filed: Jul. 22, 2015

(65) Prior Publication Data

US 2016/0153658 A1  Jun. 2, 2016

Related U.S. Application Data

(60) Provisional application No. 62/027,506, filed on Jul. 22, 2014.

(51) Int. Cl.

| | |
|---|---|
| *F02C 1/00* | (2006.01) |
| *F23R 3/00* | (2006.01) |
| *F23M 20/00* | (2014.01) |
| *F02C 7/24* | (2006.01) |
| *F23R 3/04* | (2006.01) |

(52) U.S. Cl.
CPC ............... *F23R 3/002* (2013.01); *F02C 7/24* (2013.01); *F23M 20/005* (2015.01); *F23R 3/04* (2013.01); *F23R 2900/00014* (2013.01); *F23R 2900/03042* (2013.01); *F23R 2900/03043* (2013.01); *Y02T 50/675* (2013.01)

(58) Field of Classification Search
CPC ............ F23R 3/002; F23R 2900/03044; F05B 2260/201
See application file for complete search history.

(56) References Cited

U.S. PATENT DOCUMENTS

| | | | | |
|---|---|---|---|---|
| 4,168,348 | A | * | 9/1979 | Bhangu .................. F23M 5/085 416/90 R |
| 4,292,376 | A | * | 9/1981 | Hustler ................... F23R 3/002 428/593 |
| 5,758,503 | A | | 6/1998 | Dubell et al. |
| 7,146,815 | B2 | | 12/2006 | Burd |
| 8,800,298 | B2 | | 8/2014 | Ladd et al. |
| 8,910,481 | B2 | | 12/2014 | Kim et al. |
| 8,978,385 | B2 | | 3/2015 | Cunha |
| 9,010,122 | B2 | | 4/2015 | Bangerter et al. |
| 9,052,111 | B2 | | 6/2015 | Erbas-Sen et al. |
| 9,057,523 | B2 | | 6/2015 | Cunha et al. |

(Continued)

OTHER PUBLICATIONS

EP search report for EP15177926 dated Dec. 17, 2015.

*Primary Examiner* — Gerald L Sung
(74) *Attorney, Agent, or Firm* — O'Shea Getz P.C.

(57) ABSTRACT

A vascular wall of a combustor that may be for a gas turbine engine includes a first face defining at least in-part a combustion chamber, a second face defining at least in-part a cooling air plenum, and a vascular lattice structure located between the first and second faces for distributing cooling air from the plenum and to the chamber. The vascular lattice structure may be configured to enhance cooling air flow where needed whiling providing structural support. The orientation of the vascular lattice structure may further contribute toward acoustic dampening.

14 Claims, 4 Drawing Sheets

(56) References Cited

U.S. PATENT DOCUMENTS

| | | |
|---|---|---|
| 2007/0275210 A1 | 11/2007 | Heselhaus |
| 2012/0237786 A1 | 9/2012 | Morrison et al. |
| 2014/0216042 A1 | 8/2014 | Hanson |
| 2015/0285497 A1 | 10/2015 | Sandoval |
| 2015/0285498 A1 | 10/2015 | Cunha et al. |
| 2015/0345298 A1 | 12/2015 | Mongillo et al. |
| 2016/0194967 A1* | 7/2016 | Xu .......................... F01D 5/188 416/95 |

* cited by examiner

COMBUSTOR WALL FOR A GAS TURBINE ENGINE AND METHOD OF ACOUSTIC DAMPENING

This application claims priority to U.S. Patent Appln. No. 62/027,506 filed Jul. 22, 2014.

BACKGROUND

The present disclosure relates to gas turbine engine combustors, and more particularly to vascular walls of the combustor and method of acoustic dampening.

A floating wall combustor for a turbine engine typically includes a bulkhead, an inner combustor wall assembly and an outer combustor wall assembly. The bulkhead extends radially between the inner and the outer combustor wall assemblies. Each combustor wall assembly includes a support shell and a heat shield that defines a respective radial side of a combustion chamber. Cooling cavities are defined by, and extend radially between, the heat shield and the shell. These cooling cavities fluidly couple impingement holes defined in the shell with effusion or cooling holes defined in the heat shield for cooling of the heat shield.

There is a need to minimize cooling air flowing through the cooling cavity and/or maximize cooling effectiveness to improve engine efficiency, and sound attenuation.

SUMMARY

A combustor wall according to one, non-limiting, embodiment of the present disclosure includes a first face defining at least in-part a combustion chamber; a second face defining at least in-part a cooling air plenum; and a vascular lattice structure located between the first and second faces for distributing cooling air from the plenum and to the chamber.

Additionally to the foregoing embodiment, the wall includes a hot side panel having the first face.

In the alternative or additionally thereto, in the foregoing embodiment, the hot side panel and the vascular lattice structure are one unitary piece.

In the alternative or additionally thereto, in the foregoing embodiment, the wall includes a cold side panel spaced from the vascular lattice structure and having the second face.

In the alternative or additionally thereto, in the foregoing embodiment, the wall includes a cold side panel having the second face; and wherein the hot side panel, the cold side panel and the lattice structure are formed as one unitary piece.

In the alternative or additionally thereto, in the foregoing embodiment, the wall is additive manufactured.

In the alternative or additionally thereto, in the foregoing embodiment, a plurality of inlet holes are in the second face and a plurality of outlet holes are in the first face for flowing cooling air from the plenum, through the lattice structure and into the combustion chamber.

In the alternative or additionally thereto, in the foregoing embodiment, the plurality of outlet holes are film cooling holes.

In the alternative or additionally thereto, in the foregoing embodiment, the plurality of film cooling holes are multi-lobed cooling holes.

In the alternative or additionally thereto, in the foregoing embodiment, the vascular lattice structure has a plurality of hubs and a plurality of branches projecting between the plurality of hubs in fluid communication between a plurality of inlet holes in the second face and a plurality of outlet holes in the first face.

A combustor of a gas turbine engine according to another, non-limiting, embodiment includes a hot side panel defining at least in-part a combustion chamber; a cold side panel spaced from the hot side panel and defining a cooling air plenum; and a vascular lattice structure located in an annular cooling cavity defined between the hot and cold side panels.

Additionally to the foregoing embodiment, a plurality of outlet holes are in the hot side panel and are in fluid communication between the combustion chamber and the cooling cavity, and a plurality of inlet holes are in the cold side panel and are in fluid communication between the cooling plenum and the cooling cavity.

In the alternative or additionally thereto, in the foregoing embodiment, the lattice structure is formed as one unitary piece to the hot side panel.

In the alternative or additionally thereto, in the foregoing embodiment, the lattice structure is space from the cold side panel and the plurality of inlet holes are impingement holes.

In the alternative or additionally thereto, in the foregoing embodiment, the cold side panel is formed as one unitary piece to the lattice structure and the hot side panel.

In the alternative or additionally thereto, in the foregoing embodiment, the combined hot side panel and the lattice structure are divided circumferentially into a plurality of portions and about an axis.

In the alternative or additionally thereto, in the foregoing embodiment, the vascular lattice structure has a plurality of hubs and a plurality of branches interconnected to the plurality of hubs for cooling air flow distribution.

In the alternative or additionally thereto, in the foregoing embodiment, the vascular lattice structure has a plurality of hubs and a plurality of branches interconnected to the plurality of hubs for structural support.

A method of sound attenuation in a combustor of a gas turbine engine according to another, non-limiting, embodiment includes the steps of flowing hot combustion gases through a chamber of a combustor defined by a first face having a plurality of film holes and carried by a vascular wall; flowing cooling air through the vascular wall and into the chamber; and acoustically dampening sound waves from the flow of combustion gases via the vascular wall.

Additionally to the foregoing embodiment, the method includes the step of traveling of the sound waves into a plurality of interconnected hubs and branches in the vascular wall.

The foregoing features and elements may be combined in various combination without exclusivity, unless expressly indicated otherwise. These features and elements as well as the operation thereof will become more apparent in light of the following description and the accompanying drawings. It should be understood, however, the following description and figures are intended to exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
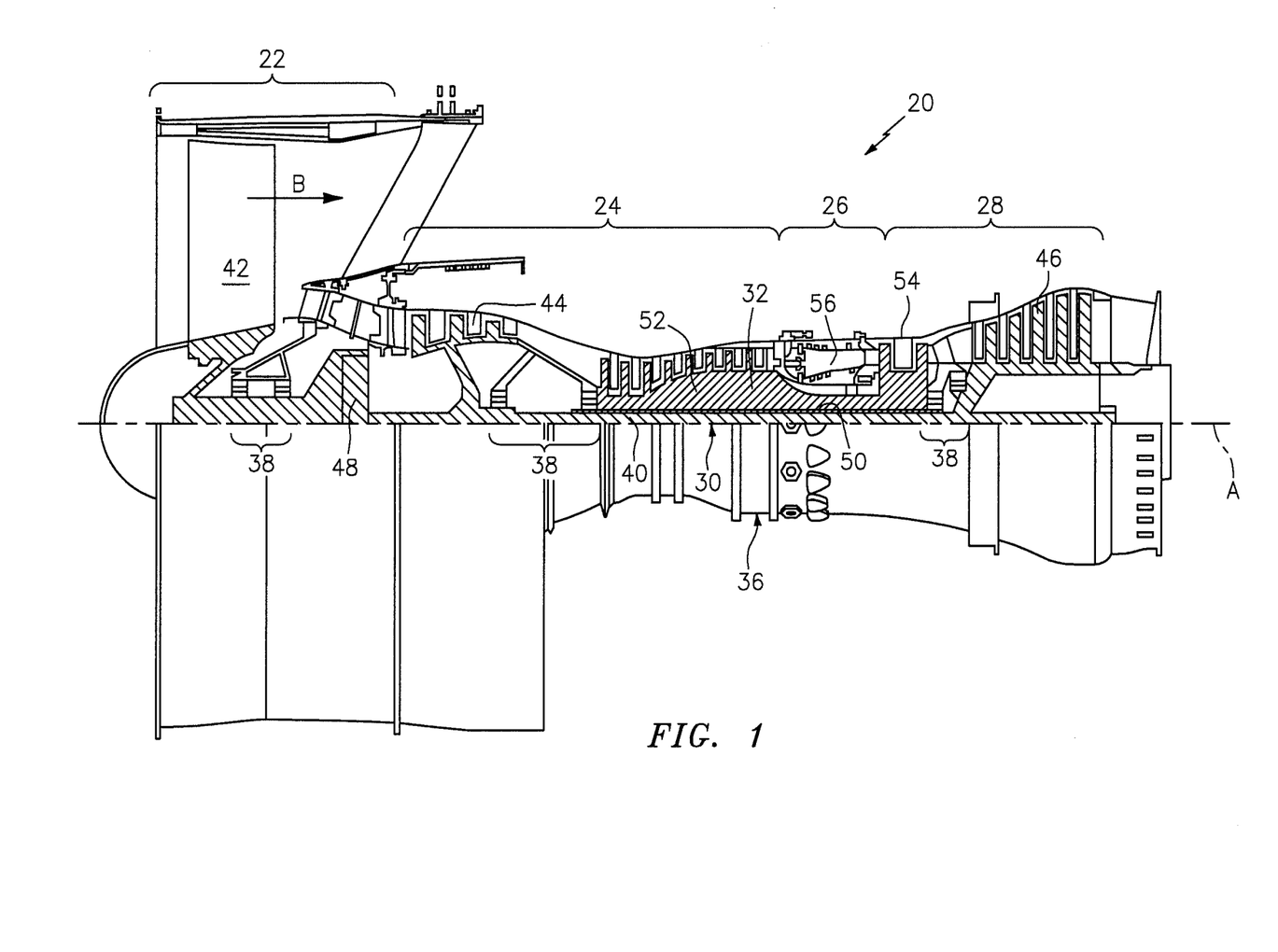
FIG. 1 is a schematic cross section of a gas turbine engine.

FIG. 1 schematically illustrates a gas turbine engine 20 disclosed as a two-spool turbo fan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engine architecture such as turbojets, turboshafts, three-spool turbofans, land-based turbine engines, and others.

The engine 20 generally includes a low spool 30 and a high spool 32 mounted for rotation about an engine axis A via several bearing structures 38 and relative to a static engine case 36. The low spool 30 generally includes an inner shaft 40 that interconnects a fan 42 of the fan section 22, a low pressure compressor 44 ("LPC") of the compressor section 24 and a low pressure turbine 46 ("LPT") of the turbine section 28. The inner shaft 40 drives the fan 42 directly, or, through a geared architecture 48 to drive the fan 42 at a lower speed than the low spool 30. An exemplary reduction transmission may be an epicyclic transmission, namely a planetary or star gear system.

The high spool 32 includes an outer shaft 50 that interconnects a high pressure compressor 52 ("HPC") of the compressor section 24 and a high pressure turbine 54 ("HPT") of the turbine section 28. A combustor 56 of the combustor section 26 is arranged between the HPC 52 and the HPT 54. The inner shaft 40 and the outer shaft 50 are concentric and rotate about the engine axis A. Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting example, the bypass ratio of the gas turbine engine 20 is greater than about ten (10:1); the fan diameter is significantly larger than the LPC 44; and the LPT 46 has a pressure ratio that is greater than about five (5:1). It should be understood; however, that the above parameters are only exemplary of one example of a geared architecture engine and that the present disclosure is applicable to other gas turbine engines including direct drive turbofans.

In one non-limiting example, a significant amount of thrust is provided by the bypass flow path B due to the high bypass ratio. The fan section 22 of the gas turbine engine 20 is designed for a particular flight condition—typically cruise at about 0.8 Mach and about 35,000 feet (10,668 meters). This flight condition, with the gas turbine engine 20 at its best fuel consumption, is also known as Thrust Specific Fuel consumption (TSFC). TSFC is an industry standard parameter of fuel consumption per unit of thrust.

Fan Pressure Ratio is the pressure ratio across a blade of the fan section 22 without the use of a fan exit guide vane system. The low Fan Pressure Ratio according to one, non-limiting, example of the gas turbine engine 20 is less than 1.45:1. Low Corrected Fan Tip Speed is the actual fan tip speed divided by an industry standard temperature correction of $(T/518.7)^{0.5}$, where "T" represents the ambient temperature in degrees Rankine. The Low Corrected Fan Tip Speed according to one non-limiting example of the gas turbine engine 20 is less than about 1150 feet per second (351 meters per second).

Figure 2:
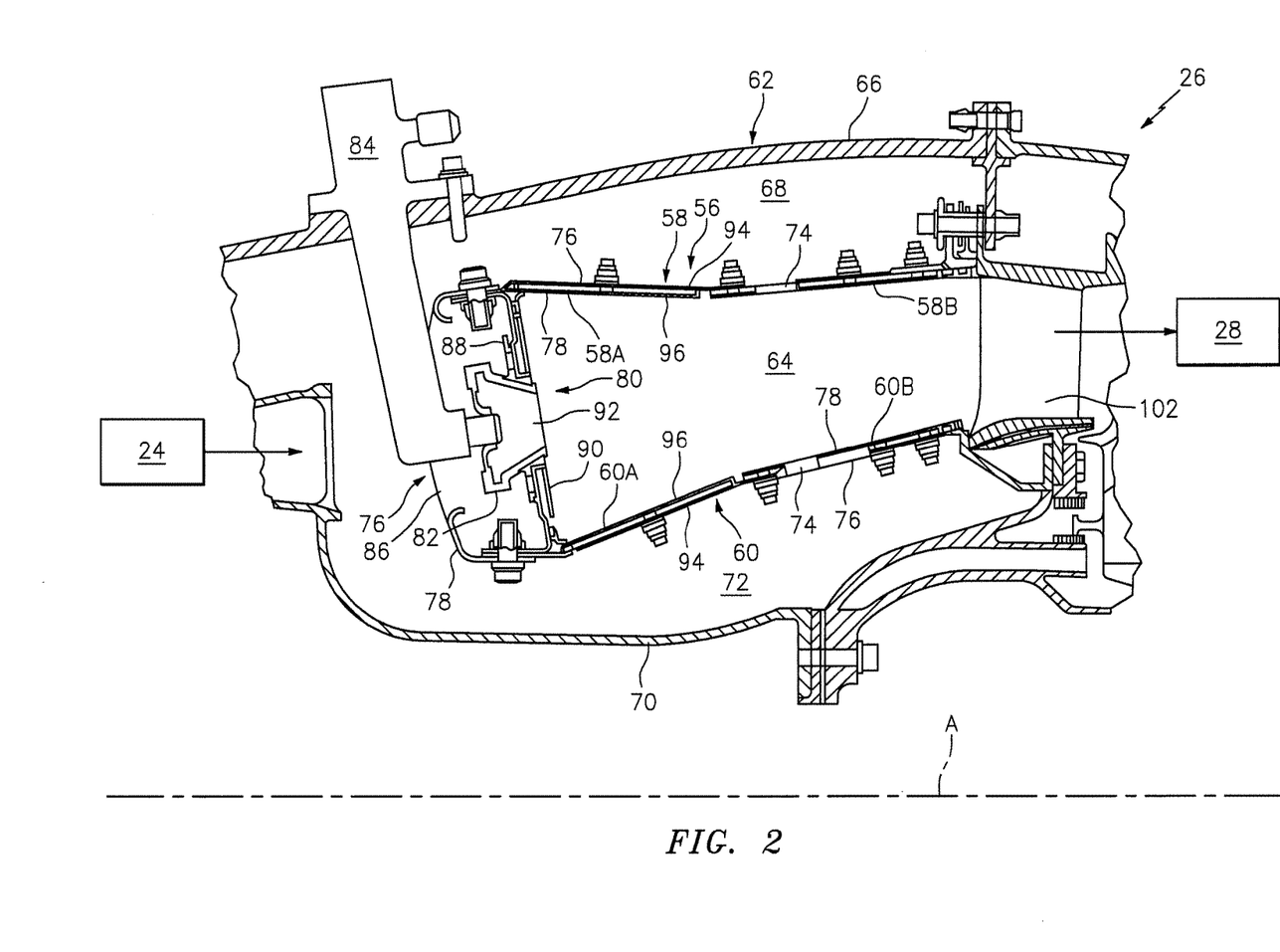
FIG. 2 is a cross section of a combustor section.

Referring to FIG. 2, the combustor section 26 generally includes an annular combustor 56 with a vascular outer wall 58, a vascular inner wall 60, and a diffuser case module 62 that surrounds walls 58, 60. The outer and inner walls 58, 60 are generally cylindrical and radially spaced apart such that an annular combustion chamber 64 is defined therebetween. The outer wall 58 is spaced radially inward from an outer diffuser case 66 of the diffuser case module 62 to define an annular outer plenum 68. The inner wall 60 is spaced radially outward from an inner diffuser case 70 of the diffuser case module 62 to define, in-part, an annular inner plenum 72. Although a particular combustor is illustrated, it should be understood that other combustor types with various combustor liner arrangements will also benefit. It is further understood that the disclosed cooling flow paths are but an illustrated embodiment and should not be so limited.

The combustion chamber 64 contains the combustion products that flow axially toward the turbine section 28. Each combustor vascular wall 58, 60 may be divided into a ring-shaped forward portion 58A, 60A and a ring-shaped aft or downstream portion 58B, 60B. At least one igniter (not shown) may project through the forward portion 58A of the outer wall 58 for igniting a fuel and air mixture in the combustion chamber 64. A plurality of circumferentially spaced dilution holes 74 may communicate through the downstream portions 58B, 60B of the respective outer and inner walls 58, 60 for flowing dilution air from the respective plenums 68, 72 and into the combustion chamber 64 for generally improving combustion efficiency and cooling the combustion air that exits the combustor 56. It is further contemplated and understood that each vascular wall 58, 60 may be further divided into more than two axial portions, and may be further divided into a plurality of circumferential sections. Such axial and circumferential separations of the walls 58, 60 may, in-part, be dictated by mechanical and thermal restraints. Each wall 58, 60, or together, may further be one-unitary piece, enabled as such (for example), through additive manufacturing.

The combustor 56 further includes a forward assembly 76 that receives compressed airflow from the compressor section 24 located immediately upstream. The forward assembly 76 generally includes an annular hood 78, a bulkhead assembly 80, and a plurality of swirlers 82 (one shown). Each of the swirlers 82 are circumferentially aligned with one of a plurality of fuel nozzles 84 (one shown) and a respective hood port 86 to project through the bulkhead assembly 80. The bulkhead assembly 80 includes a bulkhead support shell 88 secured to the forward portions 58A, 60A of the respective wall assemblies 58, 60 and a plurality of circumferentially distributed bulkhead heat shields or panels 90 secured to the bulkhead support shell 88 around each respective swirler 82 opening. The bulkhead support shell 88 is generally annular and the plurality of circumferentially distributed bulkhead panels 90 are segmented, typically one to each fuel nozzle 84 and swirler 82.

The annular hood 78 extends radially between, and is secured to, the forward-most ends of the forward portion 58A, 60A of the respective walls 58, 60. Each one of the plurality of circumferentially distributed hood ports 86 receives a respective one of the plurality of fuel nozzles 84, and facilitates the direction of compressed air into the forward end of the combustion chamber 64 through a swirler opening 92. Each fuel nozzle 84 may be secured to the outer diffuser case 66 of the case module 62 and projects through one of the hood ports 86 into the respective swirler 82.

The forward assembly 76 introduces core combustion air into the forward section of the combustion chamber 64 while the remainder of compressor air enters the outer annular plenum 68 and the inner annular plenum 72. The plurality of fuel nozzles 84 and adjacent structure generate a blended fuel-air mixture that supports stable combustion in the combustion chamber 64.

Figure 3:
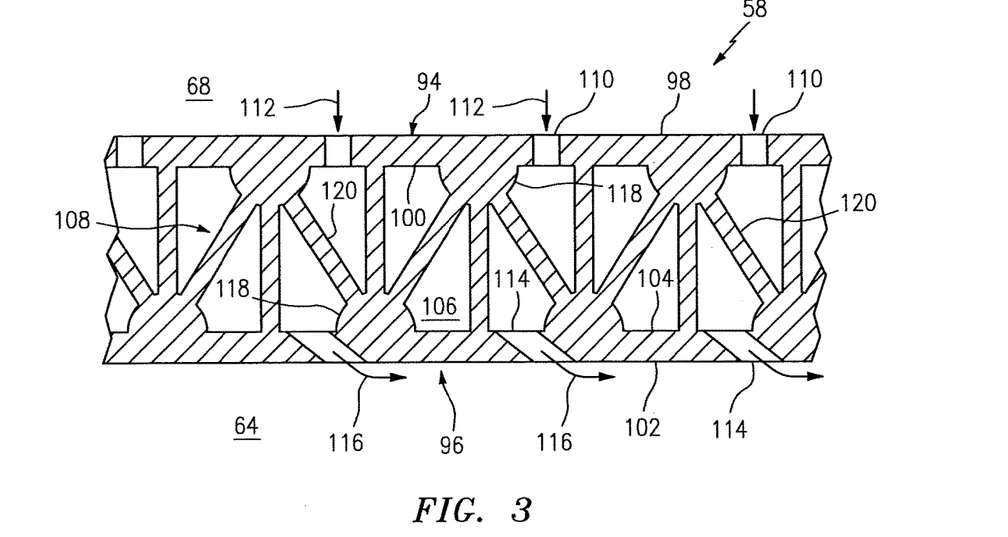
FIG. 3 is a cross section of a vascular wall of the combustor section.

Referring to FIG. 3, a cross section of the vascular outer wall 58 is illustrated; however, it should be understood that the same teaching may be applied to the inner wall 60 or other portions of the combustor 56. The vascular outer wall 58 may include a cold side panel 94 exposed to the cooling air plenum 68 and a hot side panel 96 exposed to the combustion chamber 64. The cold side panel 94 has a face 98 that defines in-part the plenum 68 and may have an opposite surface 100. The hot side panel 96 has a face 102 that defines in-part the combustion chamber 64 and an opposite surface 104 that is spaced from and opposing the surface 100. The surfaces 100, 104 may define an annular cooling cavity 106. A none-branch structure, also referred to as a lattice structure 108 (i.e. vascular engineered lattice structure) is located in the annular cooling cavity 106 and may be formed and engaged to the panels 94, 96 as one unitary piece.

A plurality of holes 110 in the cold side panel 94, which may be cooling flow re-supply hole (wherein the resupply holes may also function as impingement holes), extend through the cold side panel and are in fluid communication between the cooling plenum 68 and the cooling cavity 106 for flowing cooling air (see arrows 112) into the cavity. A plurality of film cooling holes 114 in the hot side panel 96 extend through the panel and are in fluid communication between the cooling cavity 106 and the combustion chamber 64 for flowing cooling air into the combustion chamber 64 that may, in-turn, form a film of cooling air (see arrows 116) over the hot face 102 of the panel 96 for thermal protection.

The lattice structure 108 may include hubs 118 engaged to the cold and hot side panels 94, 96 and a plurality of branches 120 engaged to and projecting between opposing hubs 118 at predetermined angles and density as determined by local cooling and structural needs. It is further contemplated and understood that the orientation of the hubs 118 and branches 120 with the remaining 'free-space' of the cavity 106 may be generally reversed. That is, the hubs and branches may be passages for the flow of air and the free-space of the cavity may be structure. The holes 110, 114 may thus be re-aligned to communicate with the hubs and/or passages for cooling air flow through the vascular wall 58.

The combustor vascular wall 58 denotes a structure of known surface and flow areas that includes a specific structural integrity. The vascular wall 58 may be a hollow vascular structure of a solid or unified material capable of controlling cooling airflow throughout the wall to convectively cool the wall where needed. The specific design and configuration of the vascular wall 58 is not intended to limiting. It will be appreciated that because the wall 58 is an engineered structure, the vascular arrangement of these structures can be tailored to the specific cooling and structural needs of any given gas turbine engine combustor. The wall 58 can be tailored to match external heat load and local life requirements by changing the design and density of the wall 58. The actual design of any given wall 58 may depend on geometry requirements, pressure loss, local cooling flow, cooling air heat pickup, thermal efficiency, overall cooling effectiveness, aerodynamic mixing, and produceability considerations, among other combustor specific parameters. In one embodiment, the wall 58 is sized based on a minimum size that can be effectively manufactured and that is not susceptible to becoming plugged by dirt or other debris.

The vascular wall 58 may be made of a super alloy such as cobalt or nickel based and may be manufactured by using a variety of manufacturing techniques. For example, the wall 58 may be created using an additive manufacturing process such as direct metal laser sintering (DMLS). Another additive manufacturing process that can be used to manufacture the wall 58 is electron beam melting (EBM). In another embodiment, select laser sintering (SLS) or select laser melting (SLM) processes may be utilized. In yet another embodiment, a casting process can be used to create the wall 58. For example, an additive manufacturing process can be used to produce a refractory metal core (RMC) such as a molybdenum core that can be used to cast the wall 58. In one embodiment, the additive manufacturing process includes utilizing a powder bed technology and the casting process includes a lost wax process. Thermal barrier coating and/or environmental barrier coating may be applied to the wall 58.

In addition to providing improved cooling capability of the hot side panel 96, the vascular structure of the wall 58 may be constructed and arranged to provide acoustic dampening, and may contribute toward weight reduction and may further secure additional design space (i.e. packaging). More particularly, sound waves produced via the turbulent flow of combustion may propagate into the various spaces defined by hubs 118 and branches 120, and thereby advantageously being dampened by such sound attenuating structures.

Figure 4:
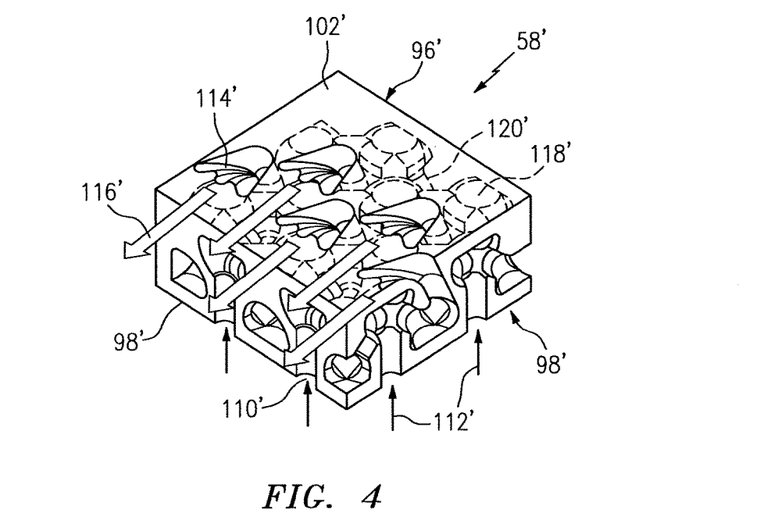
FIG. 4 is a partial perspective cross section of a second embodiment of a vascular wall.

Referring to FIG. 4, a second embodiment of a combustor wall is illustrated wherein like elements to the first embodiment have like identifying numerals except with the addition of a prime symbol. A vascular wall 58' may be a hollow vascular structure of a solid material with discrete, interconnected cooling branches or passages 120' that are connected through common hubs 118' to control airflow throughout the wall 58'. The wall 58' includes a cold side panel 98' having a plurality of inlet holes 110' and a hot side panel 96' having a plurality of outlet film holes 114'.

The film holes 114' may be cylindrical, or shaped such as multi-lobed cooling holes for improved metering of cooling airflow and improved formation of a film of cooling air across a hot face 102' of the hot side panel 96'. Such multi-lobed cooling holes are taught in U.S. Pat. No. 8,683,813, provisionally filed on Feb. 15, 2012, assigned to United Technologies Corporation, Hartford, Conn., and incorporated herein by reference in its entirety.

Figure 5:
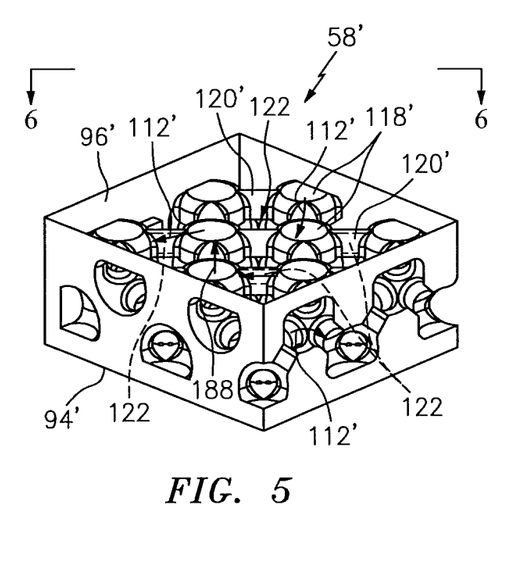
FIG. 5 is a partial perspective cross section of the second embodiment of the vascular wall with portion(s) removed to show internal detail.
Figure 6:
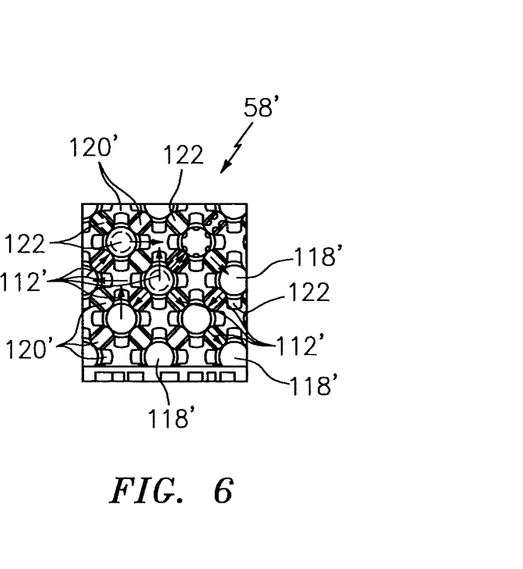
FIG. 6 is a plan view of the vascular wall viewing in the direction of arrows 6-6 in FIG. 5.

Referring to FIGS. 4 through 6, the wall 58' includes a plurality of hubs 118', a plurality of branches 120' that extend between the hubs 118', and a plurality of hollow passages 122 that may communicate between the branches 120' and the hubs 118'. The number, size and distribution of hubs 118', branches 120' and hollow passages 122 can vary from the specific configuration shown. In other words, the configuration illustrated by FIG. 5 is but one possible design.

The branches 120' may extend orthogonally or non-orthogonally and communicate directly from one hub 118' to the next. The hubs 118' and branches 120' can be manufactured as a single contiguous structure made of the same material. In one embodiment, the hubs 118' and branches 120' are uniformly distributed throughout the wall 58'. In another embodiment, the hubs 118' and branches 120' are non-uniformly distributed throughout the wall 58'.

In this "hollow lattice" structure configuration, airflow 112' can be circulated inside hollow passages 122 and the branches 120' to cool the wall 58' and ultimately the hot side panel 96'. For example, the "hollow" lattice structure may include multiple passages 122 thru which airflow 112' is passed directly from a hub 118' to a branch 120', or directly between branches 120'. The airflow 112' flows from each of the hollow branches 120' and coalesces into the hubs 118', which serve as a plenum for the airflow 112' to be redistributed to the next set of hollow branches 120' and hubs 118'. The "hollow" lattice structure forms multiple circuitous continuous passages in which the airflow 112' flows to maximize the internal convective cooling surface area and coolant mixing.

The surrounding structure that generally defines the hubs 118' and the branches 120' may act as structural members that can be tailored to "tune" steady and unsteady vibration responses in order to resist and optimally manage steady and unsteady pressure forces, centrifugal bending and curling stresses, as well as provide for improved local and section average creep and untwist characteristics and capability. The vascular arrangement of the wall 58' can be tailored to the specific cooling and structural needs of any given gas turbine engine combustor. For example, a first portion of the wall 58' can include a different combination of hubs 118', branches 120' and hollow passages 122 compared to a second portion of the wall 58'. In one embodiment, a first portion of the wall 58' may include a greater amount of cooling area whereas a second portion of the wall 58' may provide a greater amount of structural area.

Figure 7:
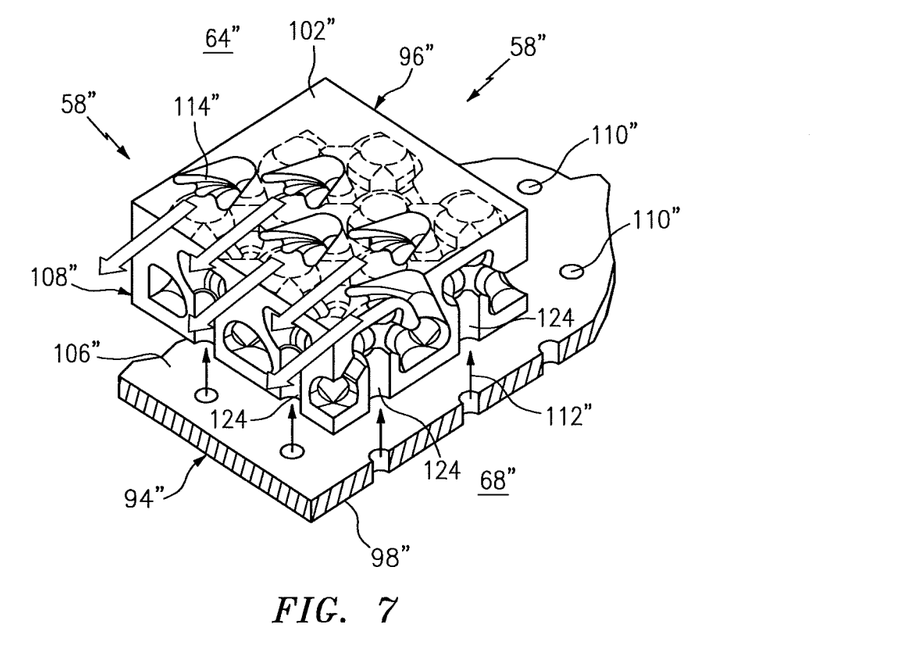
FIG. 7 is a partial perspective cross section of a third embodiment of a vascular wall.

Referring to FIG. 7, a third embodiment of a combustor wall is illustrated wherein like elements to the first embodiment have like identifying numerals except with the addition of a double prime symbol. In the third embodiment, a vascular combustor wall 58" has a cold side panel 94" and a hot side panel 96" spaced radially from the cold side panel with an annular cooling cavity 106" defined there-between. A vascular lattice structure 108" of the wall 58" is located in the cavity 106" and is formed as one unitary piece to a hot side panel 96". The cold side panel 94" is spaced radially away from the lattice structure 108" and generally supports the hot side panel 96" and the lattice structure 108" (a support is not shown). A face 102" of and carried by the hot side panel 96" defines, at least in-part, a combustion chamber 64", and a face 98" of the cold side panel 94" defines, at least in-part, a cooling air plenum 68".

The cold side panel 94" has a first plurality of re-supply holes 110" for cooling airflow 112" from the plenum 68" and into the cavity 106". From the cavity 106", the cooling airflow 112" may then enter the lattice structure 108" through a second plurality of re-supply holes 124 in the structure and exit through the film holes 114" generally in the hot side panel 96" and into the combustion chamber 64" as cooling air film 116". It is further contemplated and understood that the first plurality of re-supply holes 110" may be impingement holes and/or may or may not be aligned to the second set of re-supply holes 124.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:

1. A combustor wall comprising: a hot side panel comprising a first face, the first face defining at least in-part a combustion chamber; a cold side panel comprising a second face, the second face defining at least in-part a cooling air plenum; and a vascular lattice structure located between the first and second faces for distributing cooling air from the cooling air plenum and to the combustion chamber; the cold side panel spaced from the vascular lattice structure so as to define an annular cooling cavity therebetween.

2. The combustor wall set forth in claim 1, wherein the hot side panel and the vascular lattice structure are one unitary piece.

3. The combustor wall set forth in claim 1, wherein at least a portion of the combustor wall is additive manufactured.

4. The combustor wall set forth in claim 1, wherein a plurality of inlet holes are configured in the second face and a plurality of outlet holes are configured in the first face for flowing cooling air from the cooling air plenum, through the vascular lattice structure and into the combustion chamber.

5. The combustor wall set forth in claim 4, wherein the plurality of outlet holes are film cooling holes.

6. The combustor wall set forth in claim 5, wherein the plurality of film cooling holes are multi-lobed cooling holes.

7. The combustor wall set forth in claim 4, wherein the vascular lattice structure has a plurality of hubs and a plurality of branches projecting between the plurality of hubs in fluid communication between the plurality of inlet holes in the second face and the plurality of outlet holes in the first face.

8. A combustor of a gas turbine engine comprising: a hot side panel defining at least in-part a combustion chamber; a cold side panel spaced from the hot side panel and defining a cooling air plenum; and a vascular lattice structure located in an annular cooling cavity defined between the hot and cold side panels; wherein a gap extends between and separates the cold side panel and the vascular lattice structure to define a portion of the annular cooling cavity that accepts air from the cooling air plenum.

9. The combustor set forth in claim 8, wherein a plurality of outlet holes are in the hot side panel and are in fluid communication between the combustion chamber and the annular cooling cavity, and a plurality of inlet holes are in the cold side panel and are in fluid communication between the cooling air plenum and the cooling annular cavity.

10. The combustor set forth in claim 9, wherein the vascular lattice structure is formed as one unitary piece to the hot side panel.

11. The combustor set forth in claim 10, wherein the plurality of inlet holes are impingement holes.

12. The combustor set forth in claim 10, wherein a combination of the combined hot side panel and the vascular lattice structure is divided circumferentially into a plurality of portions and about an axis.

13. The combustor set forth in claim 8, wherein the vascular lattice structure has a plurality of hubs and a plurality of branches interconnected to the plurality of hubs for cooling air flow distribution.

14. The combustor set forth in claim 8, wherein the vascular lattice structure has a plurality of hubs and a plurality of branches interconnected to the plurality of hubs for structural support.

* * * * *